UNITED STATES PATENT OFFICE.

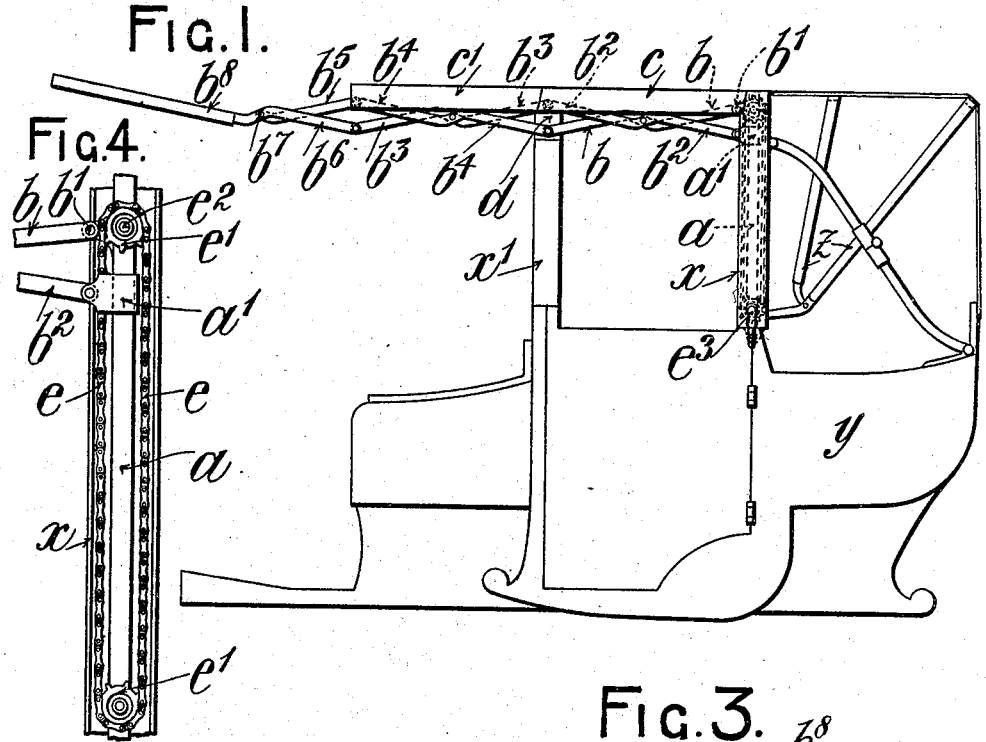
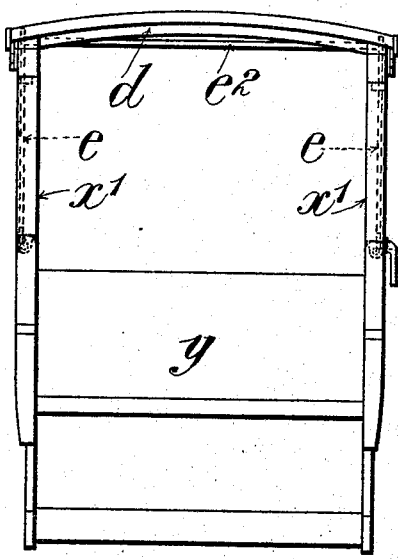
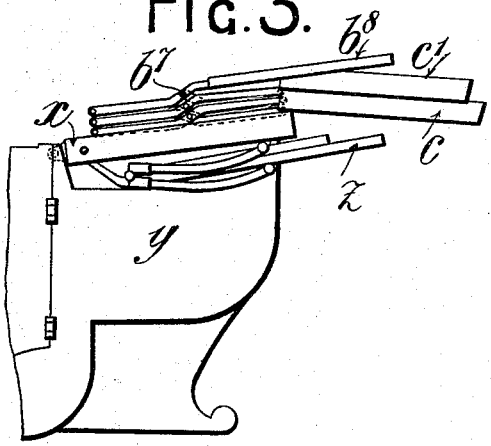

JOHN HOPPER, OF FULHAM, ENGLAND.

ROAD-VEHICLE.

932,551.

Specification of Letters Patent.  Patented Aug. 31, 1909.

Application filed February 29, 1908. Serial No. 418,584.

*To all whom it may concern:*

Be it known that I, JOHN HOPPER, a subject of the King of Great Britain and Ireland, and residing at 9 Ryecroft street, Fulham, in the county of Middlesex, England, have invented a new and useful Improvement in and Relating to Road-Vehicles, of which the following is a specification.

This invention relates to that type of road vehicle known as a landaulet, and it has for its object constructing the folding top so that it extends over the driver's seat. At the present time the folding tops of landaulets only cover the rear part or body of the vehicle and do not cover or extend over the driver's seat, and when any protection is given to the driver's seat it takes the form of an independent canopy which is incapable of being folded when not required.

In the accompanying drawing which illustrates this invention, Figure 1 is a view in side elevation of a landaulet body showing the folded top in its extended position, Fig. 2 is a view in front elevation thereof, Fig. 3 is a broken view in side elevation showing the top in its folded position, and Fig. 4 is a detail view on an enlarged scale of the spreading and folding or collapsing device.

Throughout the views similar parts are marked with like letters of reference.

According to the present invention, the rear part of the top is of the usual construction comprising two upright pillars $x$ hinged to the body $y$ and adapted to form the rear guides for the sliding windows in the doors and the usual hoop sticks $z$ carrying the leather cover, which is not shown on the drawing. Formed on or in each of the said uprights is a vertical bar $a$ and extending forward from the top of each of the said bars is a side frame constructed of a series of links arranged to operate as "lazy-tongs", the members $b$ of the rear links of the frames being pivoted at $b^1$ to said bars $a$ and the other members $b^2$ of the rear links thereof being pivoted to sockets $a^1$ adapted to slide on said bars $a$. The usual upright pillars $x^1$ in front of the side doors and adapted to form the front slides for the sliding windows in the doors are arranged to fold transversely across the body of the vehicle and they are also arranged to support the frame of the folding top. The cantrails $c$ of the roof over the side doors and also similar cantrails $c^1$ over the driver's seat are carried by the "lazy-tongs" side frames so that they will fold up and lie approximately in line with the links of the said side frames when the hood is folded as shown by Fig. 3. The members $b$ and $b^2$ of the rear links are pivoted together at their crossing points and at their front ends are pivoted to members $b^3$ $b^4$ of another pair of links. The members $b^3$ and $b^4$ are similarly pivoted together at their crossing points and at their front ends to members $b^5$ $b^6$ of a pair of links pivoted together at $b^7$. The frame for carrying the forward extension of the hood may take the form of a single bar frame $b^8$ forming an extension of or carried by the front part of the members $b^6$. The front ends of the cantrails $c$ $c^1$ are fixed to or carried by the rear ends of the members $b^3$ and $b^5$ respectively. The front ends of the cantrails $c$ carry the front bar $d$. The front bar $d$ and the pillars $x^1$ are connected together either by the usual compound wedge-shaped projection on one of the parts engaging corresponding recesses formed in the other parts or in any other suitable manner. In some cases the members of the front links of the frame may be pivoted and carried by vertical bars or supports detachably mounted on the body either on the sides of the front seats or on the dashboard.

Any suitable device may be employed to lock the sliding sockets $a^1$ on the vertical bars $a$ so as to keep the "lazy-tongs" side frames extended and any mechanical means may be employed for spreading or folding or collapsing the top. A convenient arrangement is that shown wherein sprocket chains $e$ carried by sprocket wheels $e^1$ are mounted to revolve at the top and bottom of the upright pillars $x$. The top sprocket wheels are connected to one another by means of a transverse shaft $e^2$. The ends of the sprocket chains are fixed to the sliding sockets $a^1$ and motion is imparted to the chains $e$ in either direction so as to cause the sockets $a^1$ to travel up or down the bars $a$ and so either spread or collapse the top by rotating either one of the lower sprocket wheels $e^1$ by means of a removable cranked handle $e^3$. It will be obvious that after the side frames are collapsed the frames and hood are folded down as usual into the position shown in Fig. 3.

What I claim as my invention, and desire to secure by Letters Patent is:—

1. In a landaulet the combination with the usual folding hood and top of vertical bars carried by the rear upright pillars, of side frames constructed of a series of links arranged to operate as lazy-tongs, one of the members of the rear links of each frame being pivoted at its rear end to one of said bars and the other members of said links being pivoted at their rear ends, to sockets adapted to slide on said bars, sprocket chains the ends of which are fixed to said sockets, sprocket wheels for said chains carried at the top and bottom of said rear upright pillars, a transverse shaft connecting the top sprocket wheels of each side together, and means for rotating one of the lower sprocket wheels to cause the said sockets to slide on said bars, as set forth.

2. In a landaulet the combination with the usual folding hood and top of vertical bars carried by the rear upright pillars, of side frames constructed of a series of links arranged to operate as lazy-tongs, one of the members of the rear link of each frame being pivoted at its rear end to one of said bars and the other members of said links being pivoted at their rear ends to sockets adapted to slide on said bars, of cantrails fixed to or carried at their forward ends to members of the side frames, sprocket chains the ends of which are fixed to said sprockets, sprocket wheels for said chains carried at the top and bottom of said rear upright pillars, a transverse shaft connecting the top sprocket wheels of each side together, and means for rotating one of the lower sprocket wheels to cause the said sockets to slide on said bars, as set forth.

In testimony whereof I affix my signature in the presence of two witnesses.

JOHN HOPPER.

Witnesses:
 ROBERT E. PHILLIPS,
 G. V. SYMES.